Feb. 24, 1931. D. M. FULKNIER, JR., ET AL 1,794,284
COMBINATION HOE AND RAKE
Filed Oct. 3, 1929 3 Sheets-Sheet 1
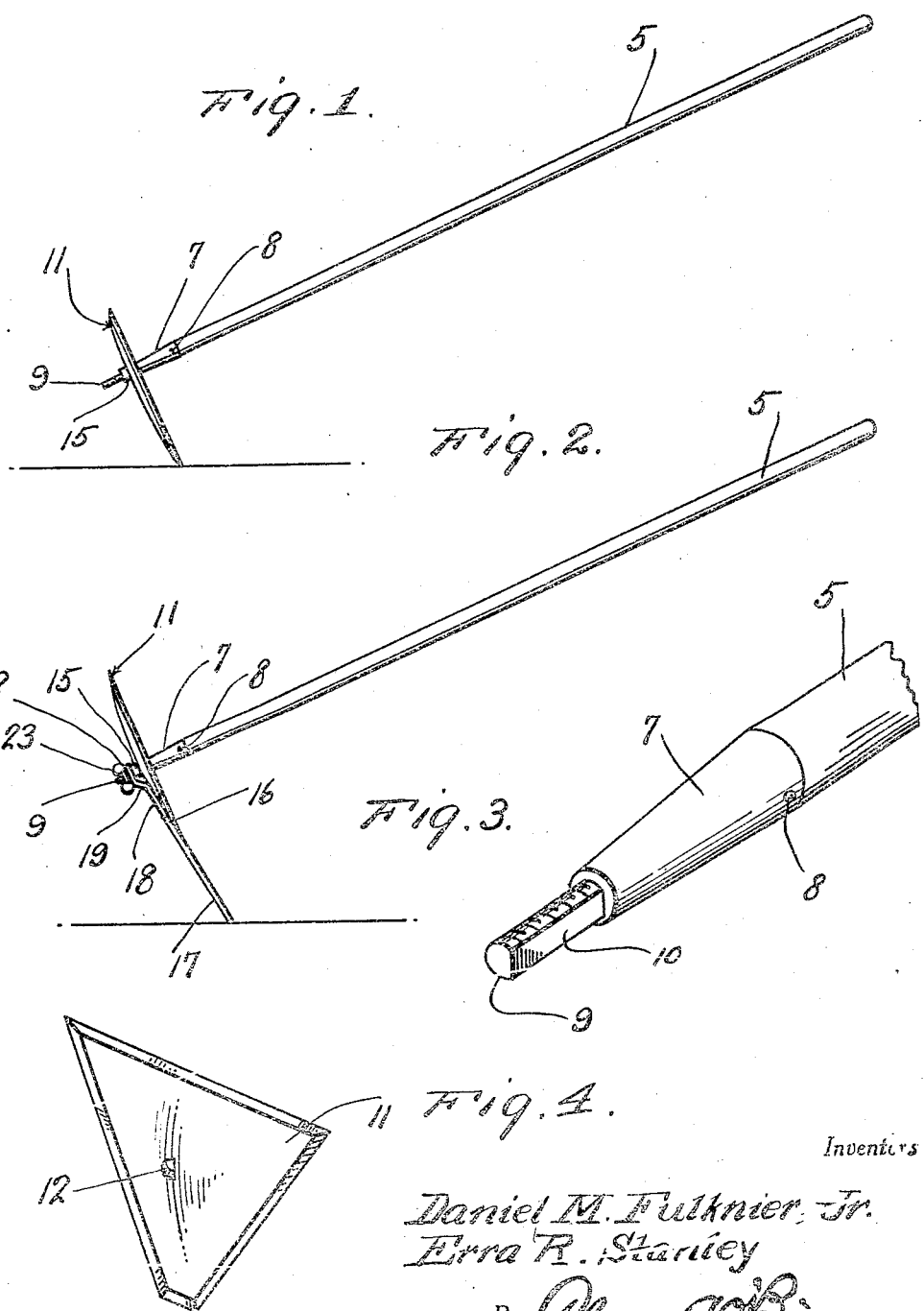
Inventors
Daniel M. Fulknier, Jr.
Ezra R. Stanley
By Clarence A. O'Brien
Attorney

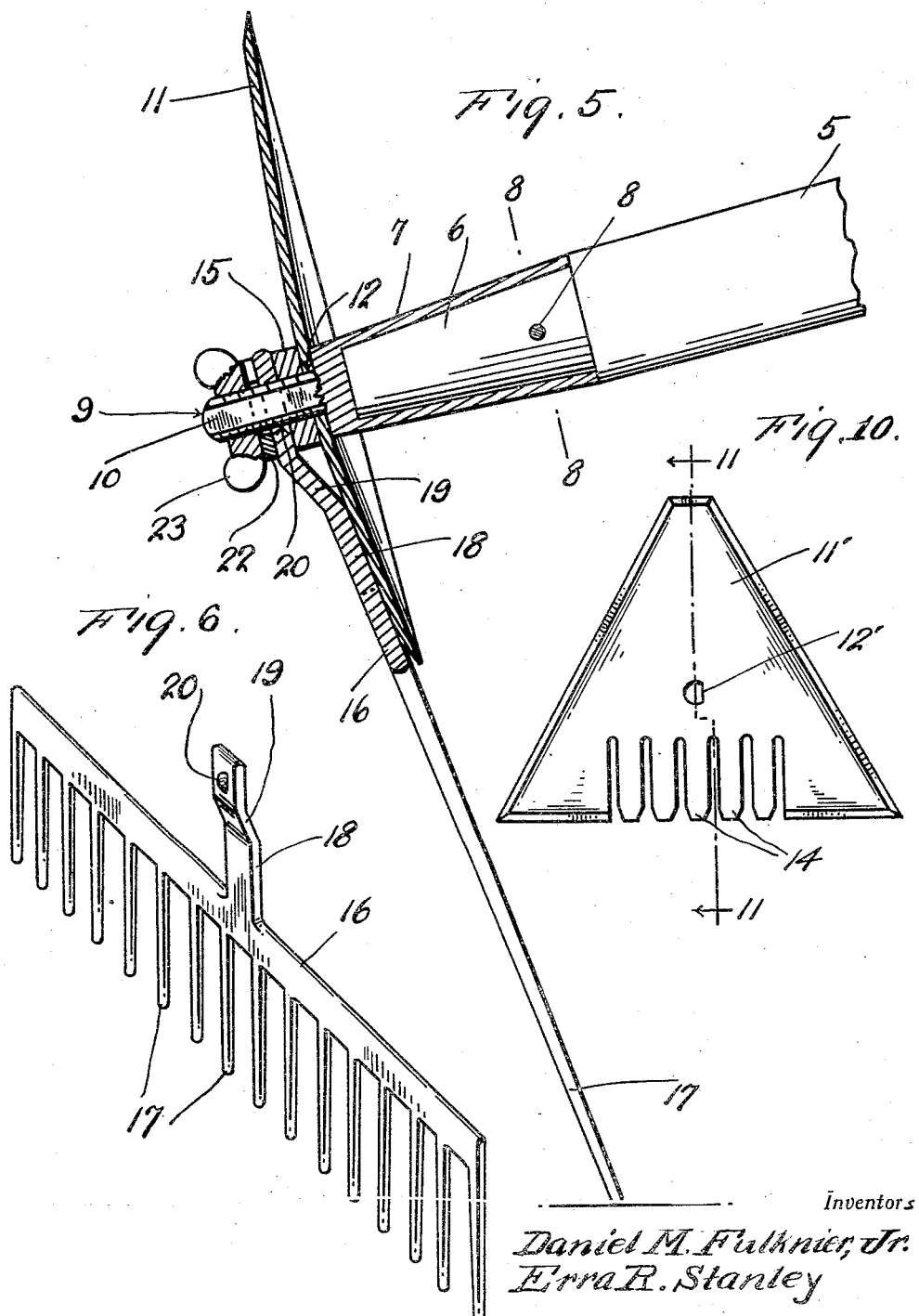

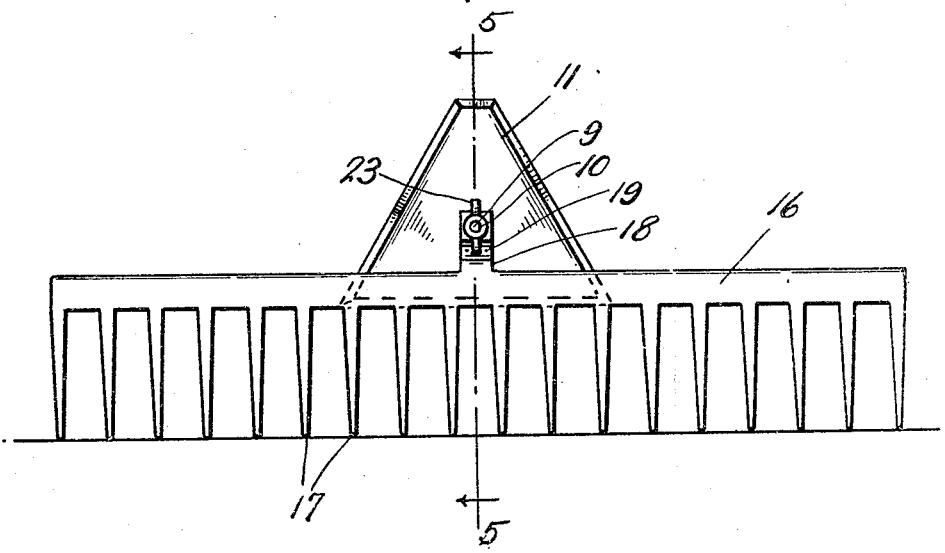
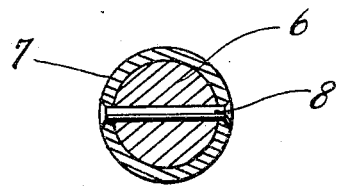
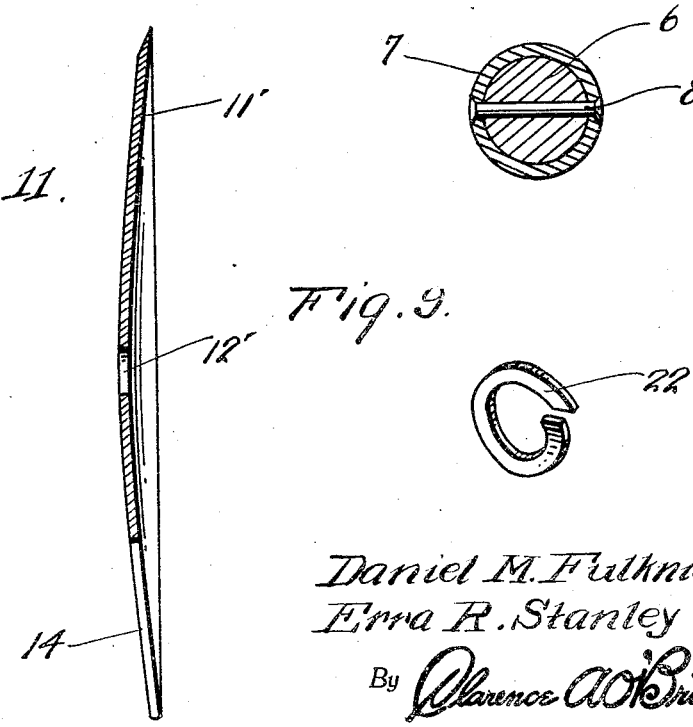

Patented Feb. 24, 1931

1,794,284

UNITED STATES PATENT OFFICE

DANIAL MADISON FULKNIER, JR., AND ERRA RUFUS STANLEY, OF DUNBAR, WEST VIRGINIA

COMBINATION HOE AND RAKE

Application filed October 3, 1929. Serial No. 397,047.

The present invention relates to a combined hoe and rake and has for its prime object to provide a structure which is exceedingly simple, inexpensive to manufacture, easy to assemble and disassemble, strong and durable, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the implement embodying the features of our invention showing the rake removed, Figure 2 is a similar view showing the rake in place, Figure 3 is a fragmentary perspective view showing the ferrule, Figure 4 is a perspective view of the hoe blade, Figure 5 is a longitudinal section through the implement, Figure 6 is a perspective view of the rake, Figure 7 is an end view of the implement, Figure 8 is a detail section taken substantially on the line 8—8 of Figure 5, Figure 9 is a perspective view of the lock washer, Figure 10 is a detail view of another embodiment of the hoe blade, and Figure 11 is a sectional view taken substantially on the line 11—11 of Figure 10.

Referring to the drawing in detail it will be seen that the numeral 5 denotes an elongated handle having fixed on reduced end 6 thereof, a tapered ferrule 7 held in place by means of pin 8. On the smaller end of the ferrule 7 there is formed a threaded shank 9 having one side flattened as indicated at 10. The hoe blade 11 or 11' is placed on the shank.

These blades 11 and 11' are triangular in formation having two pointed corners and a blunt corner and in the center are provided respectively with openings 12 and 12' having one side flattened to cooperate with the flattened side end so as to prevent turning of the hoe blade on the shank 9. The edges of the hoe blade are sharpened. The hoe blade 11' differs from the blade 11 in that one side is formed with rake means 14. The blade 11 or 11' is locked in place by means of a nut 15. The hoe blade may be used by itself whenever desired as indicated to advantage in Figure 1.

The numeral 16 denotes the head of a rake with a plurality of teeth or tines 17 projecting therefrom in one direction and a central shank 18 projecting therefrom in the opposite direction and offset intermediate its ends as at 19 and in its extremity is provided with an opening 20 having a flattened side to receive the shank 9 so that this apertured end of the shank 18 abuts the nut 15 while the head 16 abuts the hoe blade.

The hoe blade is somewhat of a concavo-convex formation with the convexed side disposed toward the rake. A lock washer 22 and a wing nut 23 hold the shank 18 securely on the shank 10 with the head 16 in abutment with the hoe blade.

Thus the hoe blade functions as a brace for the rake when the parts are assembled as best indicated in Figure 5.

The advantages of this combination implement resides in the fact that the hoe blade may be used for digging, hoeing, furrowing beds of different kinds, and is formed with sharp pointed corners which may be used to cultivate large or small plants or may be used in close places where it is difficult to use a wide edge hoe.

The blunt point may be used to rid the lawn of dandelions, and other weeds and also for digging potatoes, onions, etc.

It will also be seen that the rake may be used for the usual purposes and is exceedingly well braced for hard usage and particularly in view of the fact that it is detachable.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. In a combination implement of the class described, a handle, a shank projecting from the handle, means for attaching the shank to the handle, a hoe blade on the shank, a nut holding the hoe blade in place, a shank having an opening to receive the first mentioned shank and being offset and terminating in a head in abutment with the hoe blade, rake teeth on said head, and means for holding the second shank on the first shank in abutment with the nut.

2. In a combination implement of the class described, a handle, a shank projecting from the handle, means for attaching the shank to the handle, a hoe blade on the shank, a nut holding the hoe blade in place, a shank having an opening to receive the first mentioned shank and being offset and terminating in a head in abutment with the hoe blade, rake teeth on said head, and means for holding the second shank on the first shank in abutment with the nut, said hoe blade being of a concavo-convex formation having its convex side adjacent the second shank.

3. In a combination implement of the class described, a handle, a shank projecting from the handle, means for attaching the shank to the handle, a hoe blade on the shank, a nut holding the hoe blade in place, a shank having an opening to receive the first mentioned shank and being offset and terminating in a head in abutment with the body, rake teeth on said head, and means for holding the second shank on the first shank in abutment with the nut, said hoe blade being triangular in shape and of a concavo-convex formation having its convex side adjacent the second shank.

4. In a combination implement of the class described, a handle, a shank projecting from the handle, means for attaching the shank to the handle, a hoe blade on the shank, a nut holding the hoe blade in place, a shank having an opening to receive the first mentioned shank and being offset and terminating in a head in abutment with the hoe blade, rake teeth on said head, and means for holding the second shank on the first shank in abutment with the nut, said hoe blade being of a concavo-convex formation having its convex side adjacent the second shank, said hoe blade being also triangular in shape, and having its edges sharpened and being provided with a pair of pointed corners and a single blunt corner.

5. In a combination implement of the class described, a handle, a shank projecting from the handle, means for attaching the shank to the handle, a hoe blade on the shank, a nut holding the hoe blade in place, a shank having an opening to receive the first mentioned shank and being offset and terminating in a head in abutment with the hoe blade, and rakes on said head, and means for holding the second shank on the first shank in abutment with the nut, said hoe blade being of a concavo-convex formation having its convex side adjacent the second shank, said being triangular in shape, and having its edges sharpened and being provided with a pair of pointed corners and a single blunt corner, means for preventing the hoe blade and the second shank from rotating on the first shank.

In testimony whereof we affix our signatures.

DANIAL MADISON FULKNIER, Jr.
ERRA RUFUS STANLEY.